W. LLOYD.
FURNACE.
APPLICATION FILED MAY 4, 1916.

1,340,725.

Patented May 18, 1920.
8 SHEETS—SHEET 5.

Inventor
William Lloyd
By Howson and Howson
his Attorneys

W. LLOYD.
FURNACE.
APPLICATION FILED MAY 4, 1916.

1,340,725.

Patented May 18, 1920.
8 SHEETS—SHEET 6.

Inventor
William Lloyd
By
Howson and Howson
his Attorneys

UNITED STATES PATENT OFFICE.

WILLIAM LLOYD, OF HAZLETON, PENNSYLVANIA.

FURNACE.

1,340,725. Specification of Letters Patent. Patented May 18, 1920.

Application filed May 4, 1916. Serial No. 95,450.

*To all whom it may concern:*

Be it known that I, WILLIAM LLOYD, a citizen of the United States of America, and residing at Hazleton, in the county of Luzerne and State of Pennsylvania, have invented a certain new and useful Improvement in Furnaces, of which the following is a specification.

My invention relates to furnaces and particularly to furnaces of the traveling grate type, the object of my invention being to provide various improvements in construction hereinafter more specifically pointed out and illustrated in the accompanying drawings in which.

The present furnace is of the general type invented many years ago by Eckley B. Coxe and shown in various patents issued to this inventor and his associates. As is well understood, the fuel is supported within the combustion chamber A upon a traveling grate B, which is mounted upon chains passing over sprockets C and D at opposite ends of the grate to which fuel is delivered at one end from the hopper E. The gases of combustion may either directly heat a superposed boiler or pass out in the direction of the arrows X to water tubes or the like.

*Wind chest.*—According to the present invention the air to support combustion is led to the grate from suitable blowers (not shown) through a header 25 arranged below and to one side of the grate and extending longitudinally of the latter. From this header, risers 26 deliver the blast to the wind chest 27 arranged between the upper and lower reaches of the grate and extending throughout the fire area of the latter. This wind chest is divided by a transverse mid-partition 28 into two chambers, each of which is further subdivided by the twyer boxes 29 and 30 into which the risers 26 open. The upper portions of the transverse walls of each twyer box are inclined toward each other, or gabled, to restrict the top area of the twyer box and thus limit the superadjacent area of the fuel bed to which the blast is obstructed by the top of the twyer box, while still affording ample capacity in the twyer box for the blast entering the same through its riser 26. The wind chest is thus subdivided longitudinally into the four transverse chambers 31, 32, 33 and 34. Two longitudinal partitions 35 and 36 (Fig. 6) arranged within the wind chest 27 further subdivide each of these chambers into a mid-chamber M and two side chambers O and P on opposite sides of the mid-chamber. The wind chest is thus subdivided into twelve separate compartments into which the blast is delivered from the twyer boxes.

The supply of air to each of these compartments is separately controlled by means of slide valves 37 regulating the extent of the openings 38 in the side walls of the twyer boxes through which communication is established between the latter and the various compartments. Each of these valves is provided with an operating rod 39 which extends outward laterally through its appropriate riser 26 and is provided with a handle 40 of any suitable sort. By setting these valves in proper positions, the supply of air to each compartment may be controlled as desired. This is an important practical consideration since more air is generally needed for the central portion of the fuel bed than for the margins, and at the feed end of the bed than at the discharge end. But the needs of the furnace differ in this respect with different depths of fuel on the grate and with different characters of fuels and the flexibility of regulation which the arrangement described permits is a great advantage in enabling the fireman to adjust the blast to particular working requirements under varying conditions.

The particular manner in which the slide valves are mounted may be variously modified. I prefer to arrange them on the inner faces of the twyer boxes so that the presence of the blast serves to hold them firmly against their seats and thus maintain them tight. The upper edge of the slide may be retained by the overhanging lips 41 of brackets 42, while the lower edge may be beveled as at 43 for the purpose of automatically forcing the slide against the wall of the twyer box under the influence of the beveled bearing rollers 44 upon which the slide is supported. Stops 45 may be provided to limit the displacement of the slides and prevent them from being drawn off their supports and guides.

Figure 5:
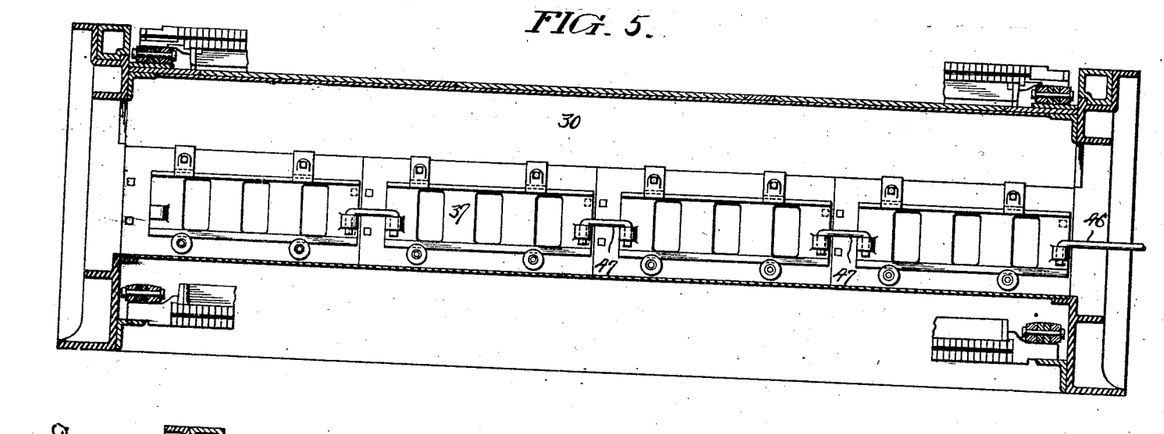
Fig. 5 is a cross section similar to Fig. 3, but showing a modified construction of the sectional gates in the wind chest.

Under certain conditions it may not be deemed necessary to have independently controlled valves for the twyer boxes. Thus in Fig. 5 a series of four slide valves is shown actuated simultaneously by a common pull rod 46, the slides being hitched together by links 47. Obviously these slides may be readily transformed into independently operated valves by removing the links 47 and attaching independent pull rods to each slide.

Figure 1:
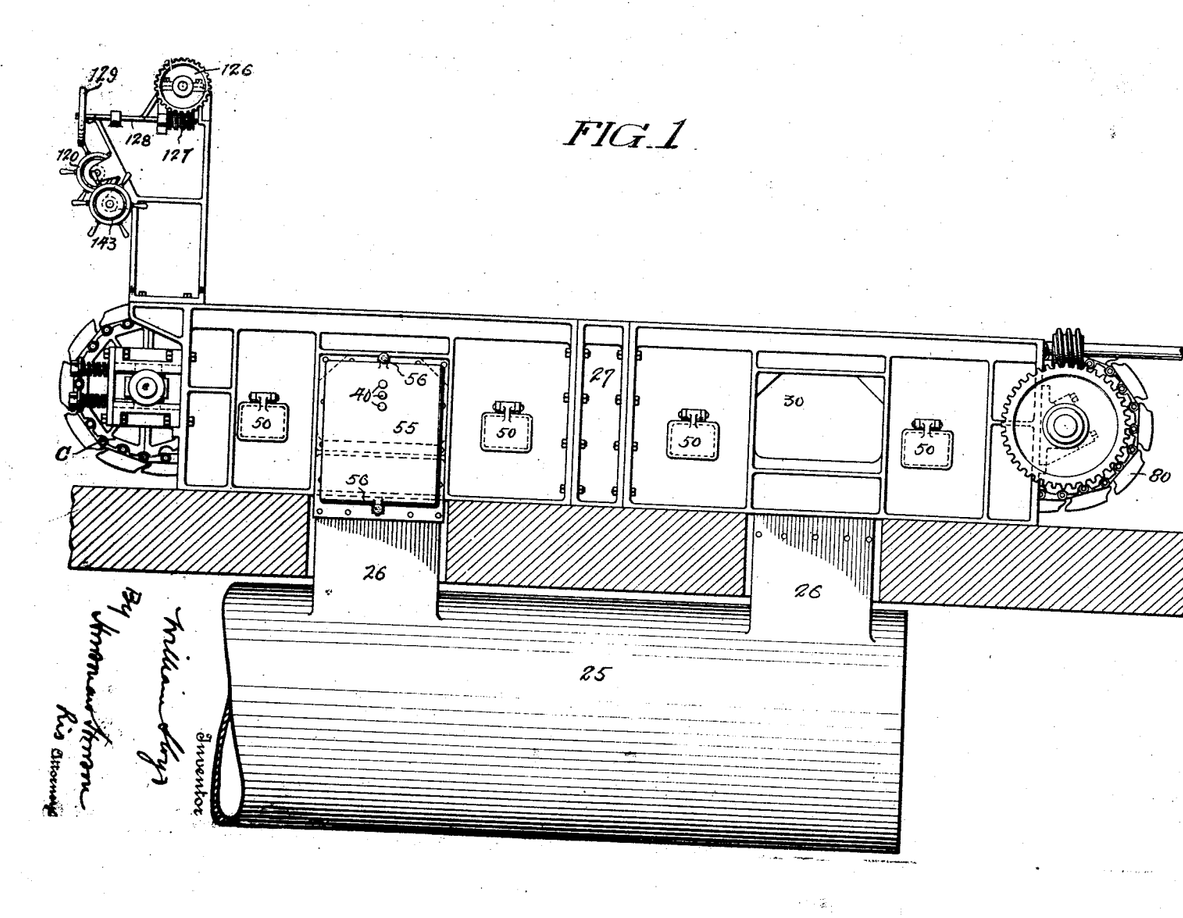
Figure 1 is a side elevation of so much of a furnace as is necessary to illustrate the features to which my invention relates.
Figure 2:
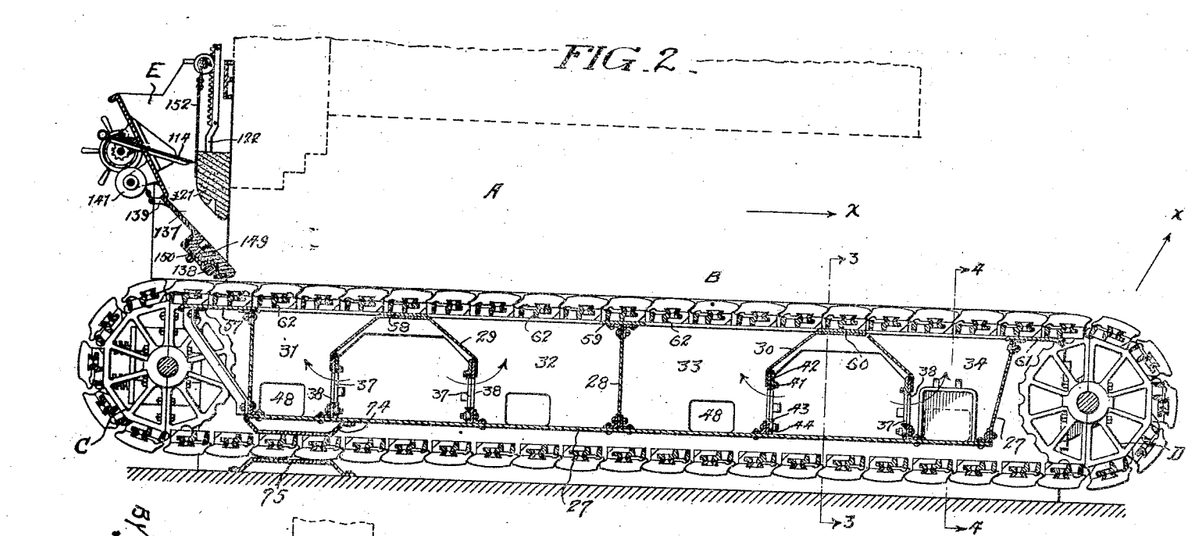
Fig. 2 is a longitudinal section therethrough.
Figure 3:
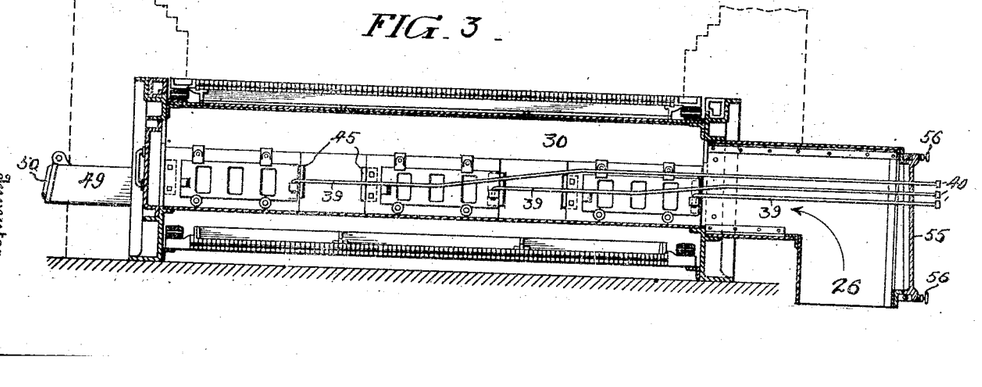
Fig. 3 is a cross section on the line 3—3, Fig. 2.
Figure 4:
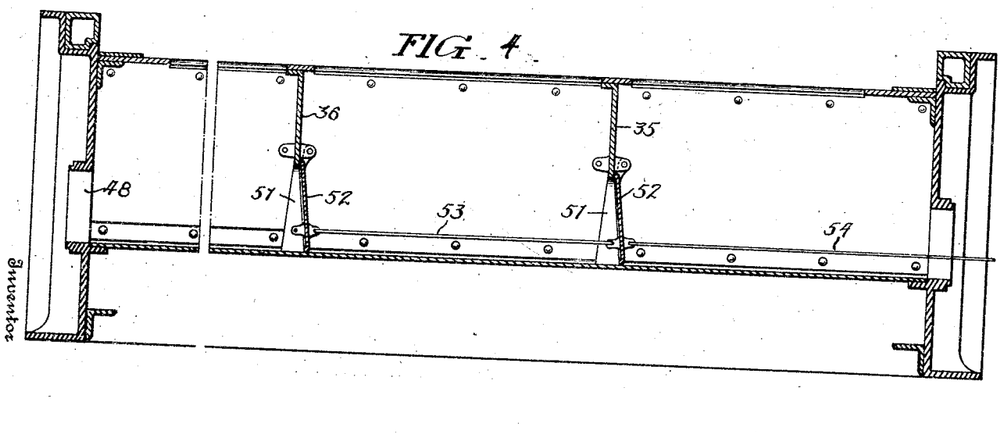
Fig. 4 is a cross section on the line 4—4, Fig. 2.

In order to permit the cleaning out of ash or fuel which may fall through the grate into the wind box chambers 31 to 34 ports 48 are opened into the sides of the wind chest from each transverse chamber to admit the clean out rake. These ports which are extended by pipes 49 through the masonry side wall of the furnace are normally closed by the doors 50 (Fig. 3) which may be maintained closed, against the pressure of the blast by spring hinges, latches or otherwise. In order to permit the cleanout rake to pass through the longitudinal partitions 35 and 36, the latter are also apertured as at 51 and these apertures normally closed by doors 52 opening in unison through link 53 and pull rod 54 (Fig. 4).

Entry into the twyer boxes for repairs, adjustments or other reasons, may be obtained through doors 55 in the risers 26, which doors are normally sealed by pivoted screw catches 56 of well known type.

*Seals.*—The distribution of the blast to the various compartments of the wind box would be ineffective for the purpose described unless means were provided to prevent leakage of the blast from one compartment to another over the tops of the twyer boxes or partitions 28, 35 and 36. To effect this seal, I rely upon a special construction of the grate bars and wind chest. In the form here shown, the transverse seal between chambers 31 to 34 and at opposite ends of the wind chest, comprises on the one hand the sealing plates 57, 58, 59, 60 and 61, and on the other hand, the sealing rib 62 arranged beneath and extending lengthwise of each grate bar 63. As the grate travels above the wind chest, its position is such that the sealing ribs 62 of the grate bars rest upon and drag successively across the sealing plates 57 to 61. Inasmuch as the latter are of such width, lengthwise of the grate, that the rib 62 of one grate bar does not escape the edge of the sealing plate before the rib 62 of the succeeding bar rides upon the same plate, it is obvious that the transverse seals are constantly maintained at the points mentioned.

The transverse seals between chambers M, O and P and at the longitudinal margins of the wind chest, are secured on the one hand by the sealing plates 64, 65, 66 and 67 (Fig. 6) which lie in the same plane as the plates 57 to 61 and are arranged at the opposite margins of the wind chest (64 and 67) and at the tops of the longitudinal partitions 35 and 36 (viz. 65 and 66), and on the other hand by the sealing cross ribs 68, 69, 70 and 71 on each of the grate bars. During the working travel of the grate the two central cross ribs 69 and 70 rest constantly upon the longitudinal sealing plates 65 and 66, while the end cross ribs 68 and 71 rest upon the marginal sealing plates 64 and 67. While each of the cross ribs 68 to 71 might be offset to interlock with the ribs of the adjacent grate bar, I have shown only the end ribs so formed. The proper positioning of the bars with relation to each other to secure registry of these cross ribs is assured by the engagement of the projecting ends of the offset end ribs 68 and 71 in notches 72 and 73 in the rear edge of the body of the preceding bar.

It is thus obvious that the blast delivered to each compartment of the wind chest cannot escape therefrom save upwardly through the grate bars.

In order to prevent possible leakage beneath the wind box to the stack, with consequent interruption of the blast and cooling of the combustion gases, I provide a pair of sealing plates 74 and 75 between which the grate on its return travel passes in inverted position. The sealing ribs 62 of the grate bars coöperate with the upper plate 74 to form a seal therewith, while the grate bar keys rest upon the lower plate and form a substantial seal therewith, thus preventing any substantial flow of air beneath the grate to the stack.

*The grate bars.*—Certain features of the grate bars 63 have already been referred to in connection with their functions as seals. Their primary function is of course to support the keys upon which the fuel directly rests. In the form shown in Figs. 7, 8 and 9 the grate bar comprises a horizontal web from the lower face of which extend downward the transverse sealing rib 62 and the cross sealing ribs 68 to 71 inclusive. The web is pierced by several rows of perforations 76 to permit the blast to pass upward therethrough. A dove-tail rib 77 with longitudinal apertures 78 overlies one row of perforations and is secured by means of bolts 79 passing downward through the web of the grate bar. This web is depressed somewhat between the raised end blocks of the bar, the shallow trough so formed being filled by the grate keys 80 slipped upon the dove-tail. The upper surfaces of the end blocks of the bar are curved to follow the contour of the keys and being flush therewith form a substantially continuous fuel support. As will be noted from Fig. 3, the outer portions of the bar ends are overhung by a projecting ledge of the masonry furnace wall, so that the fuel rests only upon the inner portion of the end surface. This portion is provided with longitudinal and transverse channels 81 (Figs. 7 and 17) which open to the key space and lead a portion of the blast to the fuel at this point.

The grate bars are supported at each end as usual upon chains 82 of special construction. Each link comprises a pair of offset bars juxtaposed at one end but spaced apart throughout the major portion of their length and embracing at their opposite ends the juxtaposed ends of the adjacent link. Between the pivots at the opposite ends of the link a space 83 is afforded to receive the stud 84 which projects downwardly beneath each end of the grate bar. A securing pin 85 (Fig. 17) passes through bosses 86 on the opposite sides of the link and through a perforation in the stud 84 thus holding the parts firmly together. To render the fastening secure and at the same time readily detachable, for the removal or repair of the grate bar, the outer boss 86 is tapped and provided with a cross slot 87 while the pin 85 is threaded adjacent its head end and provided with a cotter pin 88 adapted to enter the cross slot 87. When the stud 84 is inserted in the link the pin 85 is thrust through the holes, its smooth end being long enough to pass through the stud 84 and engage the boss 86 on the opposite side of the link, before the threaded area enters the outer boss. A few turns of the pin in the threaded boss carries it fully home, whereupon the cotter pin 88 is passed through the hole in pin 85 and into engagement with the slot 87 in the outer face of the outer boss 86, thus preventing the securing pin 85 from working out during the operation of the grate. Obviously however the fastening may be readily broken by merely withdrawing the cotter pin 88 and unscrewing and withdrawing the pin 85 whereupon the stud 84 may be lifted out of the chain link. In this way a defective grate bar may be removed and replaced by a fresh bar during the passage of the chain over the sprockets at the feed end of the furnace and without interrupting the operation of the latter.

Figure 6:
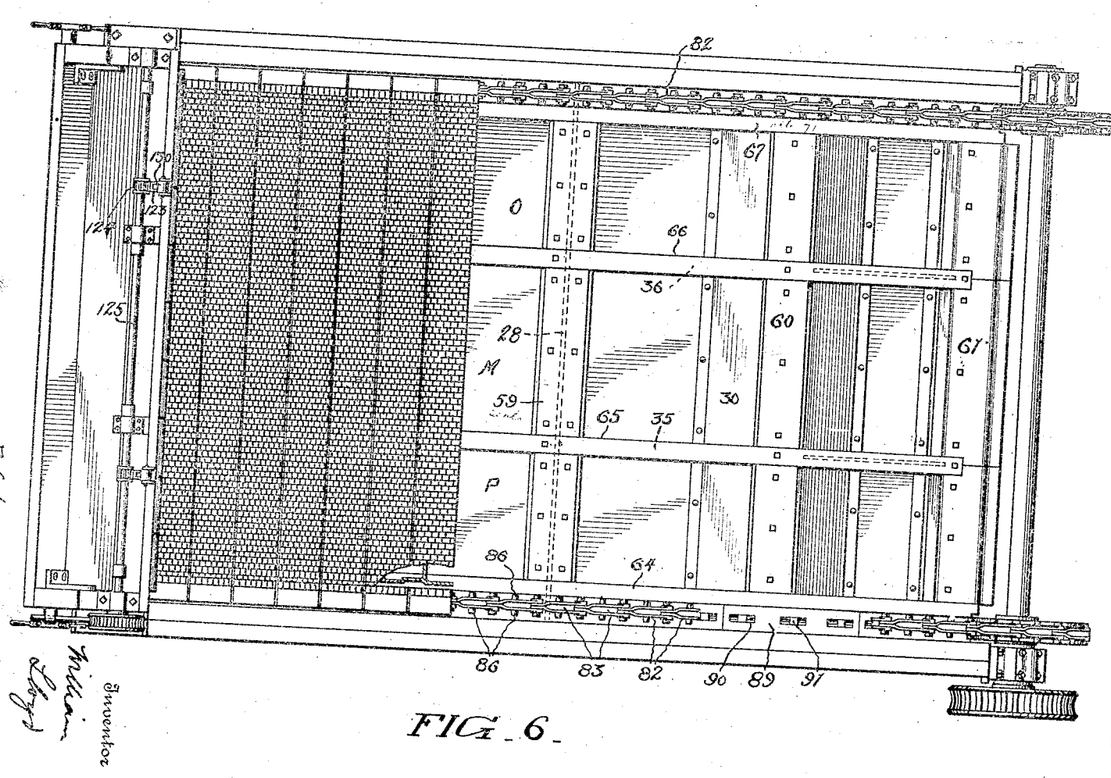
Fig. 6 is a plan of a traveling grate partially removed to show the subjacent wind chest and partially broken away to show the carrying chains and relative parts.
Figures 17, 18, 20, 21:
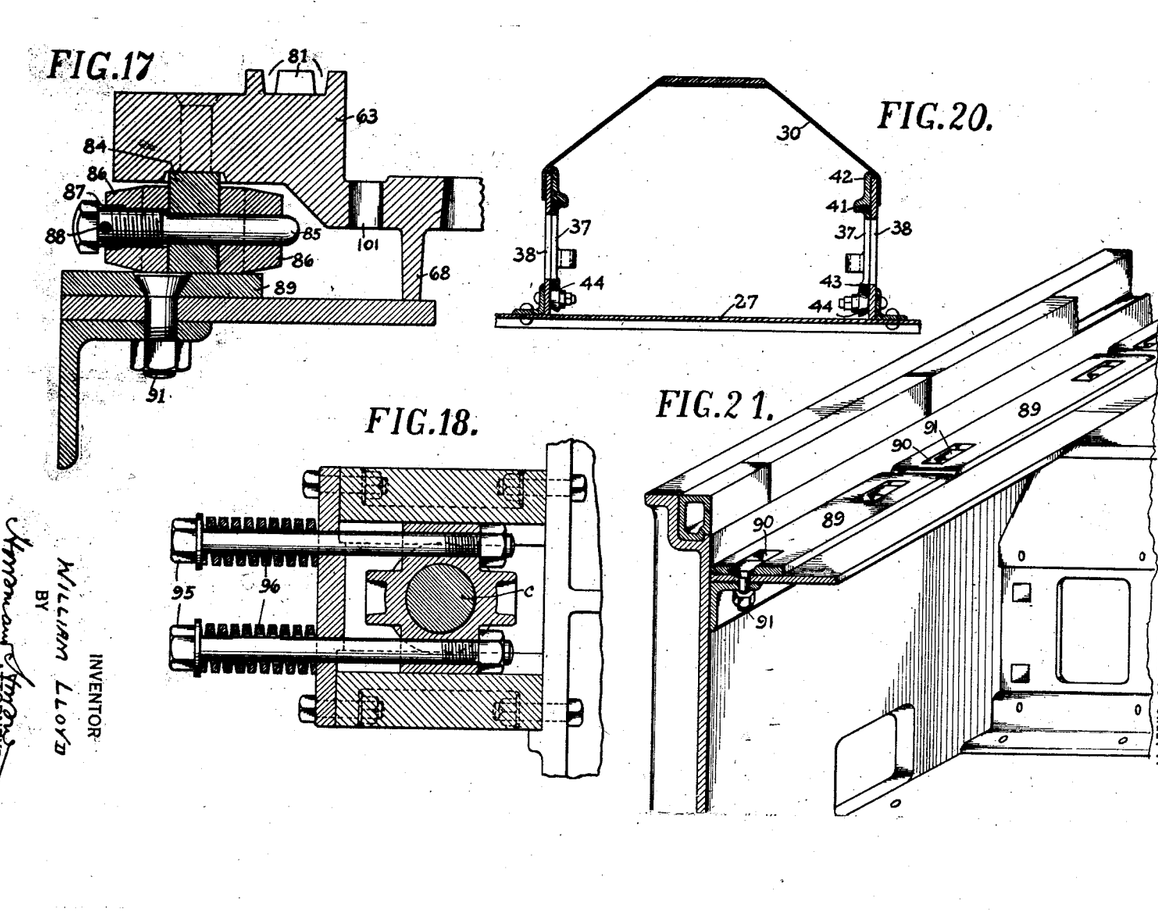
Fig. 17 is a section on the line 17—17, Fig. 13, but drawn to a larger scale.
Fig. 18 is a section through the spring-supported bearing for the chain sprocket at one end of the grate.
Fig. 20 is a cross section through one of the twyer boxes beneath the grate.
Fig. 21 is a perspective of portion of the grate, showing the renewable and adjustable wearing plates for the grate bar carrying chains.
Figure 19:
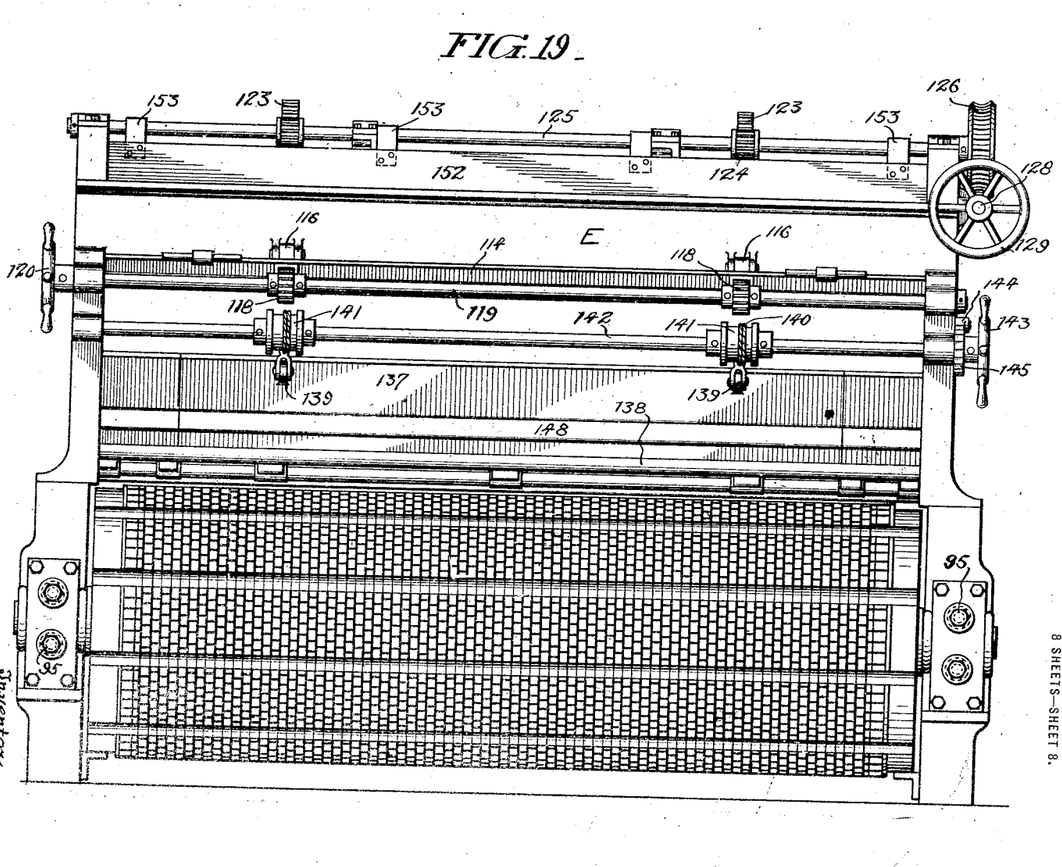
Fig. 19 is a front elevation of the feed hopper and associated parts.

Another feature of much practical value is illustrated in Figs. 6 and 17. The weight of the grate is of course sustained wholly by the carrying chains at the opposite sides of the grate. Between the end sprockets, the chain travels upon supports forming with portion of the frame, the margins of the wind box. It is impossible to prevent the coal dust and ash working through the grate upon these supports where they increase the abrasive effect of the normal frictional bearing. In order to minimize the trouble from this source, I bolt wearing bars 89 (Fig. 17) above the sealing plate 64 extending the length of the latter. The replacement and adjustment of these wearing bars which may be cast to size, is facilitated if the bolt apertures be made in the form of slots 90 (Fig. 6) with beveled margins to receive the beveled heads of the securing bolts 91. This construction makes it possible to compensate any variation in the distance between the holes due to unequal shrinkage in the iron or to small errors in laying out the holes in the supporting seal plates 64 and 67. It may be noted furthermore that a definite relation between the wearing plates 89 and the seal plates 64—67, 57, 58, 59, 60 and 61 must be maintained in order to insure the proper functioning of the grate bar sealing ribs 62, 68—71 which coöperate therewith, as above explained. This necessitates the renewal of the wearing plates 89 from time to time to insure the proper maintenance of the blast seals. The ready replacement of the wearing plates is therefore a practical necessity.

Figures 7, 8, 9, 10, 11, 12:
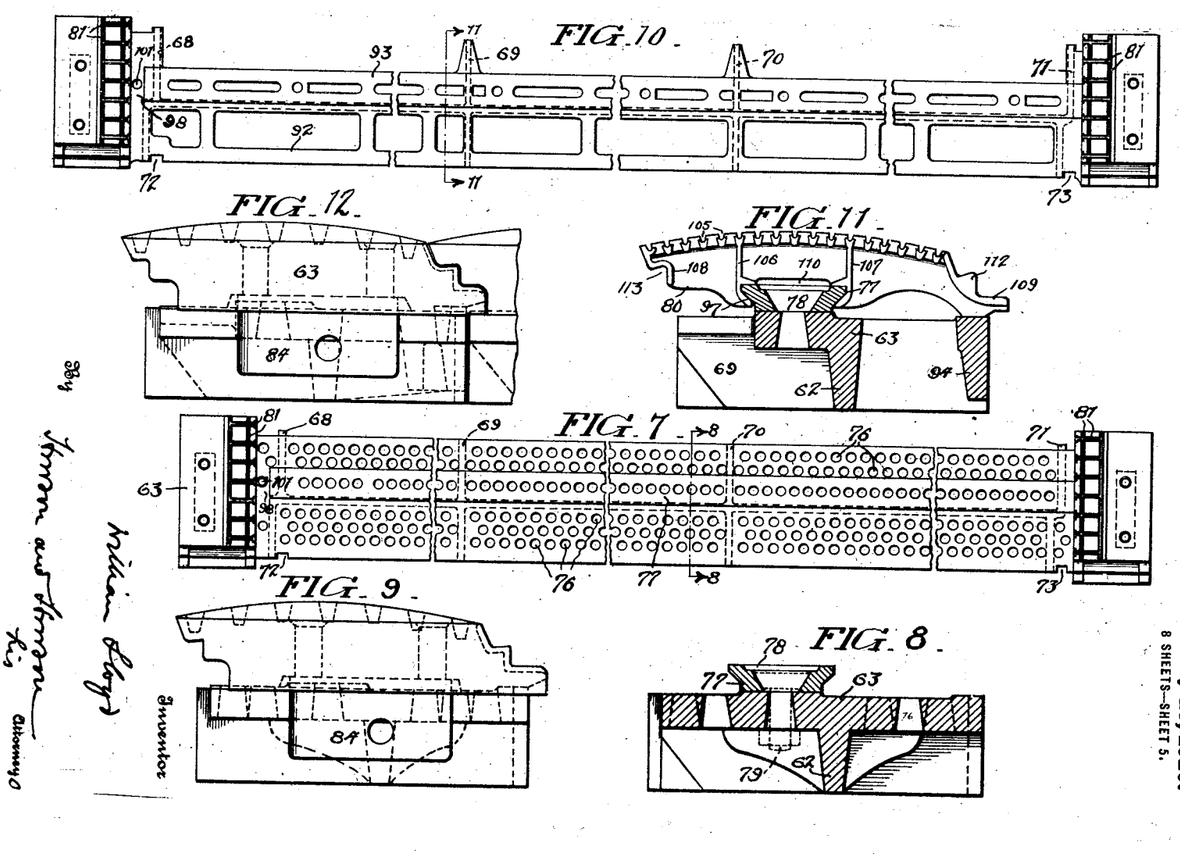
Fig. 7 is a longitudinal plan view of one of the grate bars.
Fig. 8 is a cross section therethrough on the line 8—8, Fig. 7.
Fig. 9 is an end elevation of the grate bar.
Fig. 10 is a plan of a grate bar of modified construction.
Fig. 11 is a cross section therethrough on the line 11—11, Fig. 10, and showing a grate bar key in position thereon.
Fig. 12 is an end elevation of this grate bar.
Figure 13:
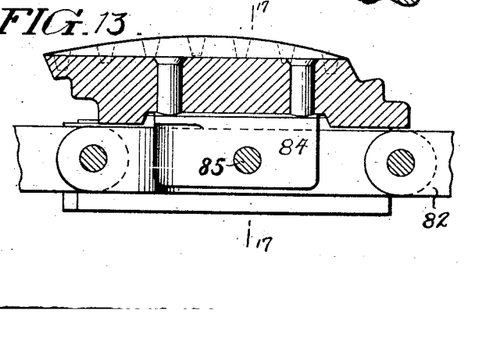
Fig. 13 is a cross section through the end of the grate bar showing the manner in which it is attached to the carrying chain.
Figure 14:
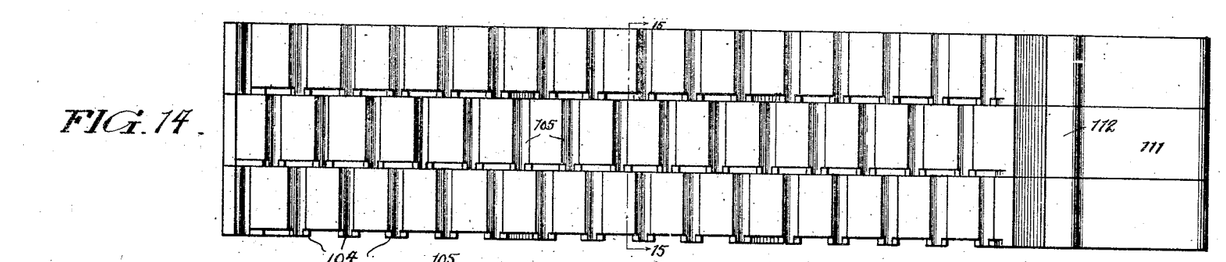
Fig. 14 is an enlarged plan of three keys in juxtaposed position on the grate bar.
Figure 15:
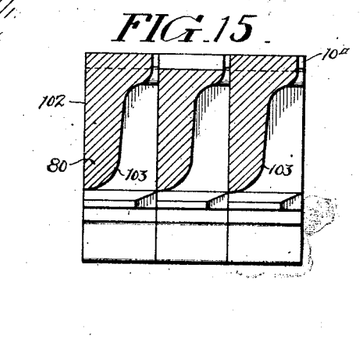
Fig. 15 is a section therethrough on the line 15—15, Fig. 14.
Figure 16:
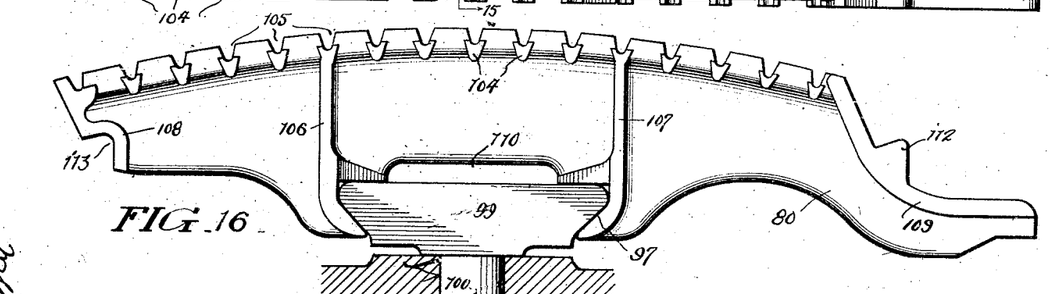
Fig. 16 is a side elevation of one of the keys drawn to the scale of Fig. 13.

The modified form of grate bar shown in Figs. 10, 11 and 12 differs from that above described mainly in the body web 92 which is here of skeleton form and entirely omitted on the forward side of the dove-tail 93. The sealing ribs 69 and 70 thus project beyond the body of the web at one edge. At the rear or following edge of the bar, a reinforcing rib 94, parallel with sealing rib 62 is provided. The depth of this rib however is less than that of the sealing rib so that no impediment is offered thereby to the flow of air to the spaces on opposite sides of the sealing rib 62 as the bar passes over one of the sealing plates 57 to 61 inclusive.

In order to keep the grate taut during the operation of the furnace the shaft $c$ for the sprocket C at the feed end of the furnace is mounted in slide-bearings supported between end brackets bolted to the furnace frame. Beneath the heads of the bolts 95, which pass through the cover plate of the brackets, are arranged heavy expansion springs 96 which constantly tend to draw the bearings outward and thus maintain the grate free from slack. In this way variations in the length of the chain due to expansion and contraction, wear, etc., are compensated.

*Grate bar keys.*—The supporting surface of each grate bar is formed by keys 80 mounted upon the dove-tail rib 77 by means of corresponding recesses 97 in the lower edges of the keys. In order to permit their adjustment upon the dove-tail 77, the latter is interrupted at some point such as 98, so that the keys may be placed with their recesses 97 alined with the rib 77 and slipped thereon. The space 98 is closed, after the rib 77 has been filled with keys, by means of a dove-tail section 99 provided with a downwardly extending pin 100 which pierces a hole 101 in the grate bar and is held in position by means of a nut (not shown) beneath the bar.

Each key 80 in the form here shown, has one flat vertical side face 102, while its opposite face 103 is recessed to permit the air to rise freely between the keys to the fuel bed. In order to space the keys slightly apart, bosses 104 are formed at the upper edge of the recessed side face 103 of each key, and adjacent the bottom of each cross slot 105 in the top of each key so as to spread the air and prevent its tendency to flow directly into these slots.

As a further ramification of the air sealing and directing feature of the present grate, each key is divided into three blast channels by the two central ribs 106 and 107 on the one hand, and the two end ribs 108 and 109 on the other hand. In the assembled grate bar, these ribs on the recessed face 103 of each bar bear against the vertical face 102 of the adjacent bar. As a consequence, the air rising on one side of the dove-tail 77 passes upward between ribs 108 and 106; that passing through the perforations in the dove-tail 77 is confined between the ribs 106 and 107 (and in this connection attention is drawn to the freeway 110 between the bottom of the key and the dove-tail to permit the blast to penetrate from one side to the other of the key); while the blast rising on the opposite or rear side of the dove-tail 77 is confined between the ribs 107 and 109. Each key area is therefore subdivided into three portions each of which has its individual air supply depending upon the size of the apertures in the grate bar on opposite sides of the dove-tail.

The cross channels 105 in the upper faces of the keys are so arranged that when the keys are placed upon the dove-tail 77 the channels of adjacent keys are in staggered relation to each other. A more perfect distribution of the blast is thus secured.

In order to prevent ash from falling between the banks of keys as they pass over the sprocket wheels at the discharge end of the grate, the keys are all provided at their rear ends with aprons 111 which extend beneath the forward end of the following bank of keys and catch the ash as the banks part at the sprocket. It has been found in practice that a greater amount of air passes up between the banks of keys than is desirable. To avoid this, I now form a projection 112 extending the width of each apron and taking into a corresponding recess 113 in the forward edge of the following key. This affords a sort of ledge or pocket which not only *per se* baffles the air and prevents the blast from passing upward freely at this point, but also serves to catch coal dust or ash and thus further restricts the cross sectional area of the passage. The ledge 112 furthermore tends to catch the ash as it drops between the grate banks on the parting of the latter at the discharge end of the furnace, and prevents it from sliding down on the lower portion of the apron. Where a heavy bed of ashes is formed on the grate this is advantageous since it helps to prevent the fall of the ash from the apron into the space between the key banks.

I claim as my invention:—

1. In combination with a traveling grate, a wind chest arranged beneath the working travel of the grate and opening to the fire bed, said wind chest being longitudinally and transversely subdivided into independent chambers, means for leading a forced draft to all of the chambers of the wind chest, and means for independently controlling the supply of air to each chamber.

2. In combination with a traveling grate, a wind chest arranged beneath the working travel of the grate and opening to the fire bed, said wind chest being longitudinally and transversely subdivided into independent chambers, means for leading a forced draft to all of the chambers of the wind chest, and means for independently controlling the supply of air to each chamber, and seals carried by the grate and coöperating with the wind chest to insure the delivery of the air of each chamber to the superposed portion of the fuel bed.

3. In combination with a traveling grate, a wind chest arranged beneath the working travel of the grate and opening to the fire bed, a twyer box transversely arranged in said chest and subdividing the same into separate chambers, blast ports opening from opposite sides of the twyer box to the chambers formed by the latter, said twyer box having its transverse walls inclined toward each other to restrict the blast-obstructing top area of the box adjacent the fuel bed, and means for controlling said ports.

4. In combination with a traveling grate, a wind chest arranged beneath the working travel of the grate and opening to the fire bed, a twyer box transversely arranged in said chest and subdividing the same into separate chambers, blast ports opening from opposite sides of the twyer box to the chambers formed by the latter, said twyer box having its transverse walls inclined toward each other to restrict the blast-obstructing top area of the box adjacent the fuel bed, and means for controlling said ports, each independent of the other.

5. In combination with a traveling grate, a wind chest arranged beneath the working travel of the grate and opening to the fire bed, a twyer box transversely arranged in said chest and subdividing the same into separate chambers, longitudinal partitioning further subdividing the transverse chambers into separate compartments, and ports opening from the twyer box to each compartment, and means for controlling said blast ports.

6. In combination with a traveling grate, a wind chest arranged beneath the working travel of the grate and opening to the fire bed, a twyer box transversely arranged in said chest and subdividing the same into separate chambers, longitudinal partitioning further subdividing the transverse chambers into separate compartments, and ports opening from the twyer box to each compartment, and means for controlling said blast ports each independently of the other.

7. In combination with a traveling grate, a subjacent wind chest having longitudinal partitions, and grate bars having ribs extending in the direction of travel of the grate and bearing on said partitions to prevent leakage thereover between longitudinally adjacent blast areas of the fuel bed.

8. In combination with a traveling grate, a subjacent wind chest having longitudinal partitioning, horizontal flanges at the top of each partition and grate bars having ribs resting during their travel on said flanges to form seals therewith, substantially as described.

9. In combination with a traveling grate, a subjacent wind chest having sealing flanges at the top of the chest walls, and grate bars having interlocking ribs resting upon said flanges to form seals therewith, for the purpose described.

10. A traveling grate having transverse grate bars with sealing ribs on their lower faces, a wind chest having sealing plates over which said ribs travel to form a seal, side chains supporting the ends of said grate bars and wearing plates on which said chains rest, said wearing plates being readily renewable in case of wear, whereby the proper relationship between the coöperating sealing plates and ribs may be maintained without difficulty.

11. In combination with a traveling grate, side chains for supporting the grate, stationary supports on which said chains slide during the working travel of the grate and longitudinally adjustable wearing plates mounted on the bearing surfaces of said supports.

12. In combination with a traveling grate, side chains for supporting the grate, stationary supports on which said chains slide during the working travel of the grate and longitudinally slotted wearing plates adjustably mounted on the bearing surfaces of said supports.

13. In combination with a traveling grate, side chains for supporting the grate, stationary supports on which said chains slide during the working travel of the grate and renewable wearing plates mounted on the bearing surfaces of said supports, said wearing plates having longitudinal slots with beveled edges and securing bolts with countersunk heads flush with said plates and serving to hold the same in longitudinally adjusted position.

14. In a traveling grate, grate bars, supporting chains for the opposite ends thereof, a lug at one end of each grate bar engaging one of said chains, and a screw pin piercing said lug and a chain link and means accessible wholly from the outer side of the chain for holding said pin and link together and disengaging the same for repairs to the grate.

15. In a traveling chain grate, a grate bar having a depending lug at one end, an open chain link into which said lug is inserted, registering perforations in said lug and link, the perforation in the outer web of the link being tapped, in combination with a screw pin piercing said link and lug but threaded only into said outer web of the link, substantially as described.

16. In a traveling chain grate, a grate bar having a depending lug at one end, an open chain link into which said lug is inserted, registering perforations in said lug and link, the perforation in the outer web of the link being tapped, in combination with a screw pin piercing said link and lug but threaded only into said outer web of the link, together with means engaging said outer web of the link to prevent the unscrewing of said pin.

17. In a traveling chain grate, an open link having on its outer web a tapped boss with cross slot, a grate bar having a depending lug entering said open link, and a screw pin piercing said lug and link and in threaded engagement with only said outer tapped boss, together with a cross pin engaging the slot of said boss to prevent said pin from accidentally unscrewing.

18. In a traveling grate, a wind box, longitudinal partitions dividing said box, pivoted clean-out gates in each partition, links connecting said gates and means for opening said gates to obtain access to the interior chambers of the wind box.

19. In a traveling grate, a wind box within the grate, longitudinal partitions dividing said box, clean-out gates in each partition and means common thereto for opening said gates simultaneously to permit access to the interior chambers of the box.

20. In a traveling grate, a grate bar having a web portion, a depending web extending lengthwise of the bar and transverse ribs extending from said web, for the purpose described.

21. In a traveling grate, a grate bar having depending transverse ribs extending in the direction of travel of the grate, said ribs being offset and interlocking with the corresponding ribs of an adjacent grate bar during the working travel of the grate, in combination with a subjacent wind chest and supports on which said ribs rest and with which they coöperate to form seals.

22. In a traveling grate, a grate bar having depending transverse ribs extending in the direction of travel of the grate, said ribs being offset and interlocking with the corresponding ribs of an adjacent grate bar during the working travel of the grate, in combination with a subjacent wind chest and supports on which said ribs rest and with which they coöperate to form seals, said grate bar having a web notched at the edge to receive the ends of the ribs of the adjacent bar.

23. In a traveling grate, a grate bar having a depressed, key-supporting web, end blocks between which said web extends, said end blocks having rearwardly extending aprons and corresponding recesses at their forward margins to receive the apron of the adjacent bar in the assembled grate, said aprons and recesses having intermediate coöperating shoulder and notch to form a baffle.

24. In a traveling grate, successive grate bar keys, the forward key having a rearwardly extending apron and the following key having a coöperating web, said apron and web having an intermediate intermeshing shoulder and notch to form a baffle, substantially as described.

25. In a traveling grate, a grate bar key recessed on one side to form an air way, and upwardly extending ribs on said side dividing the air way into a plurality of channels.

26. In a traveling grate, a grate bar key recessed on one side to form an air way, and upwardly extending ribs on said side dividing the air way into a plurality of channels, in combination with a supporting grate bar and means for separately delivering therethrough to said air channels predetermined quantities of air.

27. In a traveling grate, a bank of grate bar keys having transverse recesses in their fuel-supporting surfaces, the recesses of adjacent keys in the bank being staggered with relation to each other, substantially as described.

28. In a traveling grate, a grate bar having a skeleton dove-tail extending lengthwise of the bar, recesses in the bar on each side of the dove-tail, and a depending flange separating the blast areas on opposite sides of the dove-tail, in combination with fuel-supporting keys on said dove-tail having air spaces between adjacent keys, and ribs on the keys dividing each air space into channels, one for the air passing through the skeleton rib and others for the air rising on opposite sides of the dove-tail.

In testimony whereof I have signed my name to this specification, in the presence of two subscribing witnesses.

WILLIAM LLOYD.

Witnesses:
  CHAS. W. LOTZ,
  JOHN M. WILSON.